(12) United States Patent
Yamamoto et al.

(10) Patent No.: US 8,772,991 B2
(45) Date of Patent: Jul. 8, 2014

(54) IN-WHEEL MOTOR DRIVEN DEVICE

(75) Inventors: Tetsuya Yamamoto, Iwata (JP);
Tomoaki Makino, Iwata (JP)

(73) Assignee: NTN Corporation, Osaka (JP)

( * ) Notice: Subject to any disclaimer, the term of this patent is extended or adjusted under 35 U.S.C. 154(b) by 112 days.

(21) Appl. No.: 13/582,245

(22) PCT Filed: Feb. 2, 2011

(86) PCT No.: PCT/JP2011/052083
§ 371 (c)(1),
(2), (4) Date: Aug. 31, 2012

(87) PCT Pub. No.: WO2011/108329
PCT Pub. Date: Sep. 9, 2011

(65) Prior Publication Data
US 2012/0326573 A1 Dec. 27, 2012

(30) Foreign Application Priority Data

Mar. 4, 2010 (JP) .................................. 2010-047812

(51) Int. Cl.
*H02K 7/10* (2006.01)

(52) U.S. Cl.
USPC .............................. 310/75 R; 310/80; 310/83

(58) Field of Classification Search
USPC .......... 310/75 R, 80–83, 95–99; 475/178–179
See application file for complete search history.

(56) References Cited

U.S. PATENT DOCUMENTS

| | | | | |
|---|---|---|---|---|
| 5,024,636 A | * | 6/1991 | Phebus et al. | 475/141 |
| 6,852,061 B2 | * | 2/2005 | Schoon | 475/348 |
| 7,243,749 B2 | * | 7/2007 | Kakinami et al. | 180/65.51 |
| 7,351,177 B2 | * | 4/2008 | Christ | 475/168 |
| 7,530,416 B2 | * | 5/2009 | Suzuki | 180/65.51 |
| 7,779,971 B2 | * | 8/2010 | Adachi | 188/72.1 |
| 8,033,943 B2 | * | 10/2011 | Suzuki | 475/179 |

(Continued)

FOREIGN PATENT DOCUMENTS

| | | |
|---|---|---|
| JP | 2006-57676 | 3/2006 |
| JP | 2007-247857 | 9/2007 |

(Continued)

OTHER PUBLICATIONS

Supplementary European Search Report issued Sep. 11, 2013 in corresponding European Application No. EP 11 75 0442.

(Continued)

*Primary Examiner* — Thanh Lam
(74) *Attorney, Agent, or Firm* — Wenderoth, Lind & Ponack, L.L.P.

(57) ABSTRACT

An object of the present invention is to maintain a predetermined positional relationship between an outer pin holder and a housing in a speed reducer section B, to prevent damage to such components as revolving members, outer circumferential engagers, and motion conversion mechanism upon a large axial load due to turning or sudden acceleration/deceleration, and to eliminate rattling noise caused by a housing and the outer pin holder. An elastic member is disposed on one or both axial end surfaces of the outer pin holder, between the outer pin holder and the housing. As a result, even if there is an axial load exerted on the outer pin holder, the outer pin holder is always held at a predetermined position by restoring force from the elastic member(s), in a proper positional relationship with the housing.

12 Claims, 16 Drawing Sheets

(56) References Cited

U.S. PATENT DOCUMENTS

| | | | |
|---|---|---|---|
| 8,323,143 B2 * | 12/2012 | Schoon | 475/337 |
| 2009/0101424 A1 | 4/2009 | Suzuki | |
| 2011/0130238 A1 * | 6/2011 | Schoon | 475/154 |
| 2011/0133541 A1 | 6/2011 | Makino et al. | |

FOREIGN PATENT DOCUMENTS

| | | |
|---|---|---|
| JP | 2008-309264 | 12/2008 |
| JP | 2009-52630 | 3/2009 |
| JP | 2010-7731 | 1/2010 |
| WO | 2007/102545 | 9/2007 |

OTHER PUBLICATIONS

International Preliminary Report on Patentability issued Oct. 11, 2012 in International (PCT) Application No. PCT/JP2011/052083.

International Search Report issued Apr. 26, 2011 in International (PCT) Application No. PCT/JP2011/052083.

* cited by examiner

IN-WHEEL MOTOR DRIVEN DEVICE

TECHNICAL FIELD

The present invention relates to an in-wheel motor driving device which connects an electric motor's output shaft with a wheel hub via a speed reducer.

BACKGROUND ART

A conventional in-wheel motor driving device 101 is disclosed in JP-A-2009-52630 (Patent Literature 1) for example.

As shown in FIG. 16, the in-wheel motor driving device 101 includes a housing 102 which is attached to a vehicle body; a motor section 103 which is placed therein and generates a driving force; a wheel hub bearing section 104 which is connected to a wheel; and a speed reducer section 105 which reduces rotating speed of the motor section 103 and transmits the rotation to the wheel hub bearing section 104.

In the in-wheel motor driving device 101 of the above-described construction, a low-torque high-rotation motor is utilized for the motor section 103 in view of reducing the size of the device. On the other hand, the wheel hub bearing section 104 requires a large torque in order to drive the wheel. For these reasons, a cycloid reduction gear system is often utilized for the speed reducer section 105 due to its compactness and high speed-reduction ratio.

A speed reducer section 105 utilizing a cycloid reduction gear system includes a motor-side rotation member 106 which has eccentric sections 106a, 106b; cycloid discs 107a, 107b which are disposed in the eccentric sections 106a, 106b; roller bearings 106c which rotatably support the cycloid discs 107a, 107b with respect to the motor-side rotation member 106; a plurality of outer circumferential engagers 108 which make engagement with outer circumferential surfaces of the cycloid discs 107a, 107b to generate rotational movement of the cycloid discs 107a, 107b; and a plurality of inner pins 109 which transmit the rotational movement of the cycloid discs 107a, 107b to the wheel-side rotation member 110.

The outer circumferential engager 108 is not held directly by the housing 102a of the speed reducer section 105, but is held by an outer circumferential engager holding section 113 which is provided on an inner diameter surface of the housing 102a. More specifically, it is held rotatably by needle bearings 114 which have their axial end portions fixed to the outer circumferential engager holding section 113. By making the outer circumferential engager 108 rotatable with respect to the outer circumferential engager holding section 113 in this way, contact resistance caused by engagement with the cycloid discs 107a, 107b is reduced.

CITATION LIST

Patent Literature

Patent Literature 1: JP-A-2009-52630

SUMMARY OF INVENTION

Technical Problem

As shown in an enlarged view in FIG. 17, the outer circumferential engager holding section 113 has a cylindrical section 113a and a pair of ring portions 113b, 113b extending radially inward from an axial ends of the cylindrical section 113a. With the above, the outer circumferential engager holding section 113 is fitted and fixed into the inner diameter surface of the housing 102a via buffer members 115. The buffer members 115 allow redial and axial displacement of the outer circumferential engager holding section 113. This protects the cycloid discs 107a, 107b, the outer circumferential engager 108, the inner pins 109 and other components from being damaged by a large radial load or moment load which could be caused by sharp turning, sudden acceleration/deceleration, etc. of the electric vehicle. Also, the arrangement eliminates rattling noise caused by contact between the housing 102a and the outer circumferential engager holding section 113 due to vibration when driving rough terrains for example.

However, in this arrangement where axial displacement is allowed by the buffer members 115 to eliminate rattling noise made by the housing 102a and the outer circumferential engager holding section 113, there is a problem. Specifically, although the buffer members 115 have a certain restoring force to bring the outer circumferential engager holding section 113 back into position, the buffer members 115 do not have a sufficient restoring force to bring the outer circumferential engager holding section 113 back into position. Thus, a large radial load or moment load caused by turning, sudden acceleration/deceleration, etc. can damage the cycloid discs 107a, 107b, outer pins 108, the inner pins 109 or other components.

It is therefore an object of the present invention to provide an arrangement capable of eliminating rattling noise caused by the housing of the speed reducer section and the outer circumferential engager holding section and maintaining a predetermined positional relationship between the outer circumferential engager holding section and the housing of the speed reducer section, thereby preventing damage to the components such as cycloid discs, outer circumferential engager, and inner pins.

Solution to Problem

In order to achieve the above-described object, the present invention provides an in-wheel motor driving device which includes: a motor section which drives and thereby rotates a motor-side rotation member having eccentric sections; a speed reducer section which reduces a rotating speed of the motor-side rotation member for transmission to a wheel-side rotation member; a housing which holds the motor section and the speed reducer section; and a wheel hub which is fixed to and connected with the wheel-side rotation member. In this in-wheel motor driving device the speed reducer section includes: a revolving member which has a through-hole for insertion of the eccentric section and makes a revolving movement around a rotation axis of the motor-side rotation member in association with the rotation of the motor-side rotation member; an outer circumferential engager which makes engagement with an outer circumferential portion of the revolving member thereby causing a rotational movement of the revolving member; an outer circumferential engager holding section fitted and fixed to an inner diameter surface of the housing which holds the speed reducer section, for holding the outer circumferential engager in parallel with the rotational axis of the motor-side rotation member; and a motion conversion mechanism which converts the rotational movement of the revolving member into rotational movement of the motor-side rotation member about its rotation axis, for transmission to the wheel-side rotation member. With the above-described arrangement; an elastic member is disposed on one or each of two axial end surfaces of the outer circumferential engager holding section, between the housing and the outer circumferential engager holding section.

Preferably, a buffer member is disposed between an outer circumferential surface of the outer circumferential engager holding section and the housing.

The elastic member may be provided by a wave spring, a disc spring, a disc spring which has cutouts in its circumferential direction, an antivibration rubber, etc.

Also, the elastic member may be provided by a plurality of coil springs disposed on an end surface of the housing equidistantly in a circumferential direction.

Also, an end plate for the outer circumferential engager may be disposed between the elastic member and the outer circumferential engager.

The elastic member may be connected with the end plate. Connecting the elastic member with the end plate improves assemblability.

The end plate and the elastic member may be connected by various connection means. One example is that one of the two members is formed with an engaging recess while the other is formed with an engaging projection. Another example may be that the end plate is formed with a recess, into which the elastic member is pressed. Still another may be that the two members are swaged together.

Also, the elastic member may be formed integrally with the end plate.

Advantageous Effects of Invention

As described, according to the present invention, an elastic member is disposed on one or both axial end surfaces of the outer circumferential engager holding section, between the housing and the outer circumferential engager holding section. Therefore, even if there is an axial load exerted on the outer circumferential engager holding section, the outer circumferential engager holding section is always held at a predetermined position by restoring force from the elastic member(s). Therefore, a correct positional relationship with the fixing member of the speed reducer section is maintained.

The invention also prevents such components as the revolving member, outer circumferential engager and motion conversion mechanism, from being damaged by a large load or moment load which could be caused by turning, sudden acceleration/deceleration, etc.

The invention also eliminates rattling noise caused by the housing and the outer circumferential engager holding section due to axial vibration when driving on, e.g., a rough terrain.

DESCRIPTION OF EMBODIMENTS

Hereinafter, embodiments of the present invention will be described based on the attached drawings.

Figure 6:
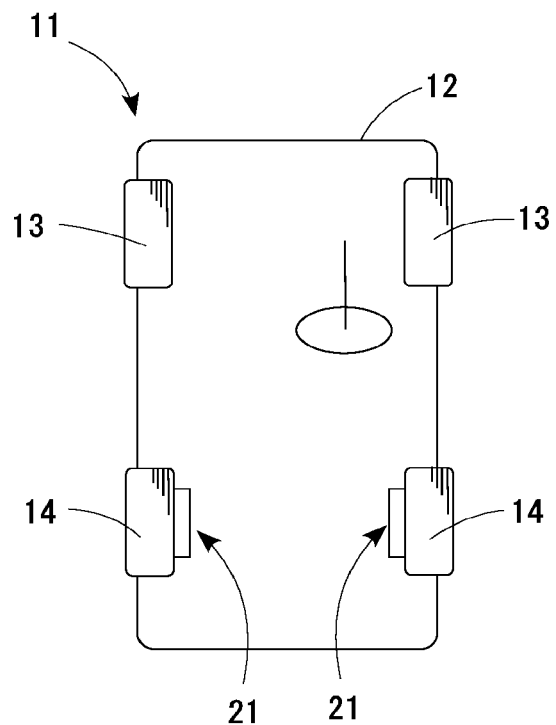
FIG. 6 is a schematic plan view of an electric vehicle which includes the in-wheel motor driving devices in FIG. 1.
Figure 7:
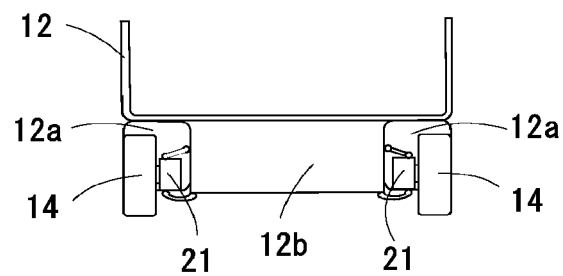
FIG. 7 is a rear view of the electric vehicle in FIG. 6.

As shown in FIG. 6, an electric vehicle 11 equipped with in-wheel motor driving devices according to an embodiment of the present invention includes a chassis 12, front wheels 13 as steering wheels, rear wheels 14 as driving wheels, and in-wheel motor driving devices 21 which transmit driving forces to the left and the right rear wheels 14 respectively. As shown in FIG. 7, the rear wheels 14 are housed inside wheel housings 12*a* of the chassis 12, and are fixed to a lower portion of the chassis 12 via a suspension system (suspension) 12*b*.

The suspension system 12*b* includes suspension arms extending in the left and right directions and supporting the rear wheels 14, and struts each having a coil spring section and a shock absorber, for absorbing vibrations coming through the rear wheels 14 from the ground and thereby reducing vibration of the chassis 12. Further, a stabilizer which reduces tilting of the vehicle body during turning operations for example, is provided at a connection of the left and right suspension arms. Preferably, the suspension system 12*b* should be designed as an independent suspension system which is capable of allowing the left and the right wheels to move in vertical direction independently from each other for improved ground following and efficient transmission of driving force to the road surface even when the road surface has some irregularities.

In the electric vehicle 11, each of the in-wheel motor driving devices 21 is housed individually inside the corresponding wheel housing 12a and drives one of the left and the right rear wheels 14, so that there is no need for providing a motor, a drive shaft, a deferential gear mechanism, etc. on the chassis 12. This provides an advantage that an increased space can be provided for the driver and passengers, and rotation of the left and the right drive wheels can be controlled independently from each other.

It is necessary, however, to reduce the unsprung weight in order for the electric vehicle 11 to have improved driving stability. Also, in order to provide more driver/passenger space, there is a requirement for size/weight reduction in the in-wheel motor driving devices 21.

Figure 1:
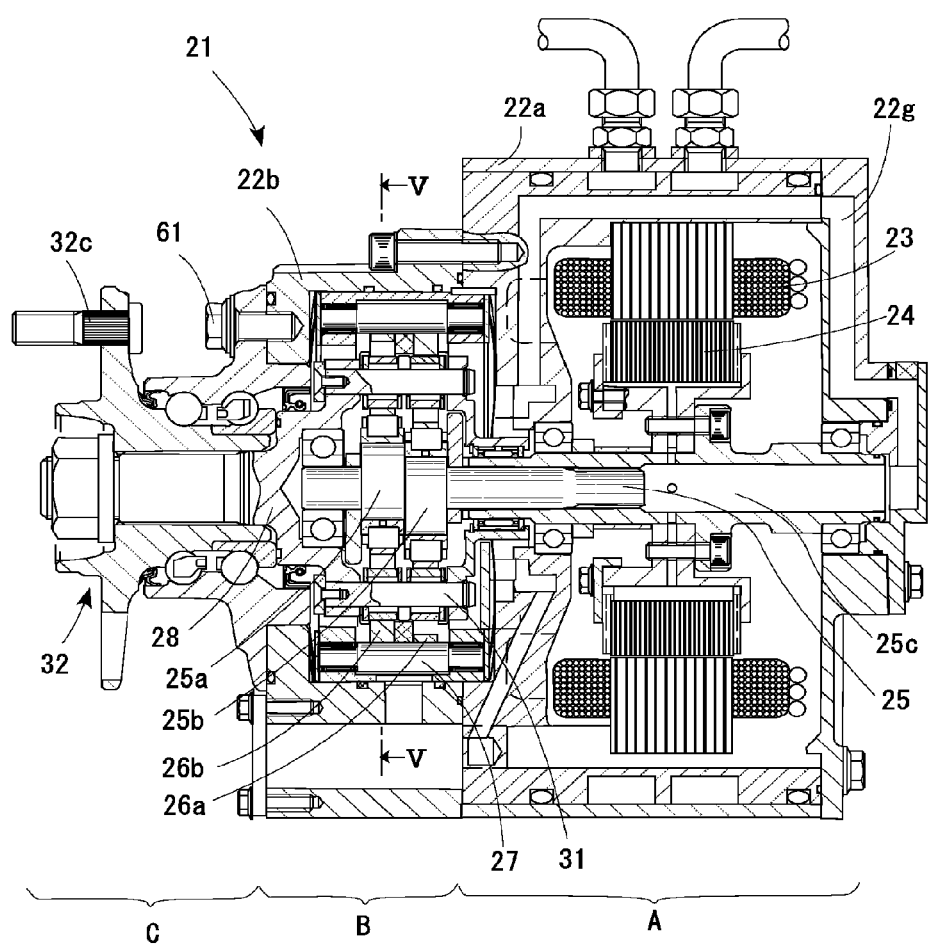
FIG. 1 is a schematic sectional view of an in-wheel motor driving device according to an embodiment of the present invention.

As shown in FIG. 1, the in-wheel motor driving device 21 includes a motor section A which generates a driving force; a speed reducer section B which reduces rotating speed of the motor section A before it is outputted; and a wheel hub bearing section C which transmits the output from the speed reducer section B to the driving wheel 14. The motor section A and the speed reducer section B are housed in the motor section housing 22a and the speed reducer section housing 22b, and the device is installed inside the wheel housing 12a of the electric vehicle 11 as shown in FIG. 6.

Figure 2:
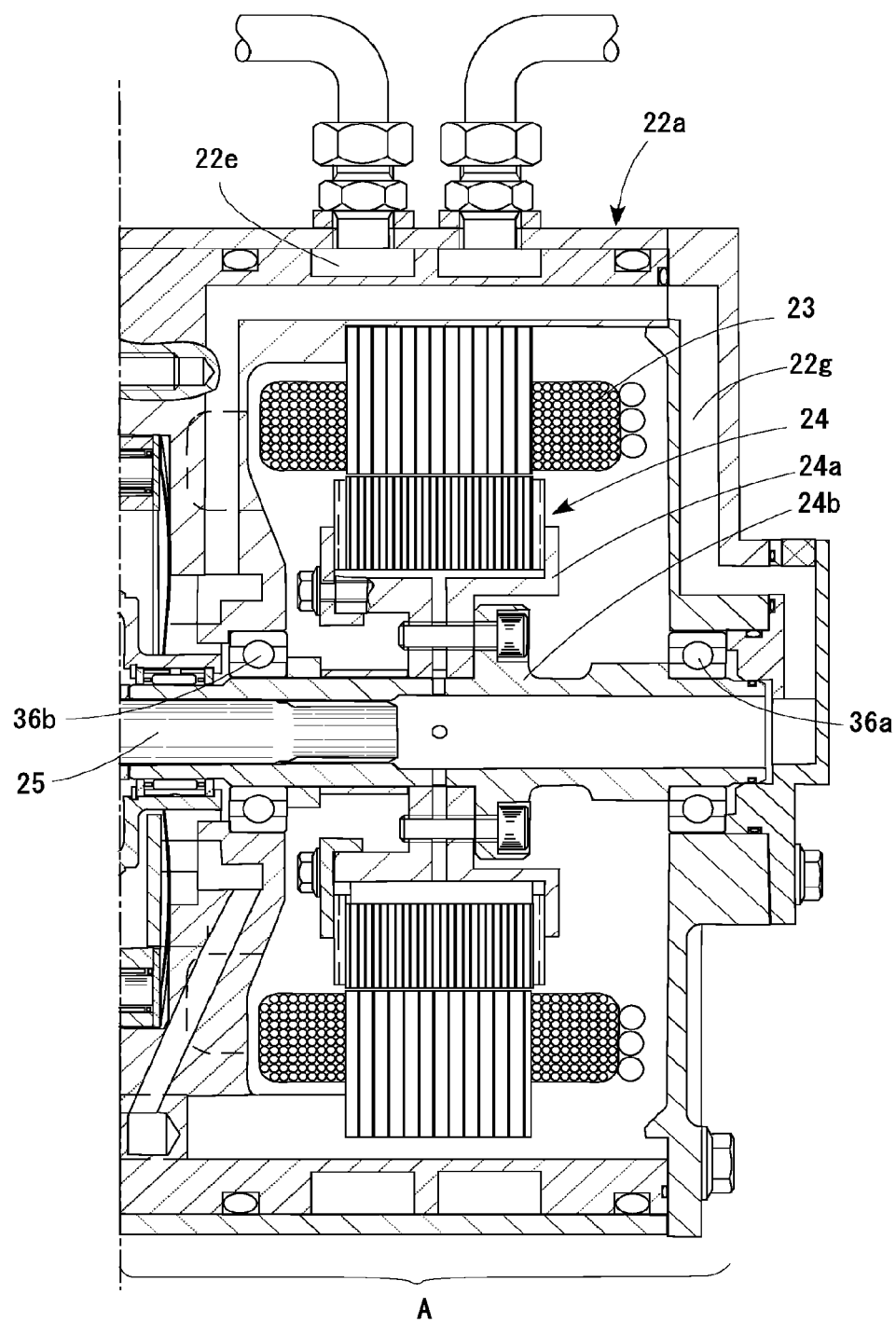
FIG. 2 is an enlarged view of a motor section in FIG. 1.

As shown in FIG. 2, the motor section A is provided by a radial-gap motor which includes a stator 23 fixed to the motor section housing 22a; a rotor 24 disposed inside the stator 23 to face thereto with a radial gap in between; and a motor-side rotation member 25 disposed inside the rotor 24, being fixed thereto for integral rotation with the rotor 24. The rotor 24 includes a flange-shaped rotor section 24a and a cylindrical hollow section 24b, and is supported by roller bearings 36a, 36b rotatably with respect to the motor section housing 22a.

The motor-side rotation member 25, which transmits the driving force from the motor section A to the speed reducer section B, is disposed across the motor section A and the speed reducer section B, and includes eccentric sections 25a, 25b inside the speed reducer section B. The motor-side rotation member 25 is fitted into and fixed to a hollow section 24b of the rotor 24, and rotates together with the rotor 24. The two eccentric sections 25a, 25b are disposed at a 180-degree phase difference so that their centrifugal forces from their eccentric movement are cancelled each other.

Figure 3:
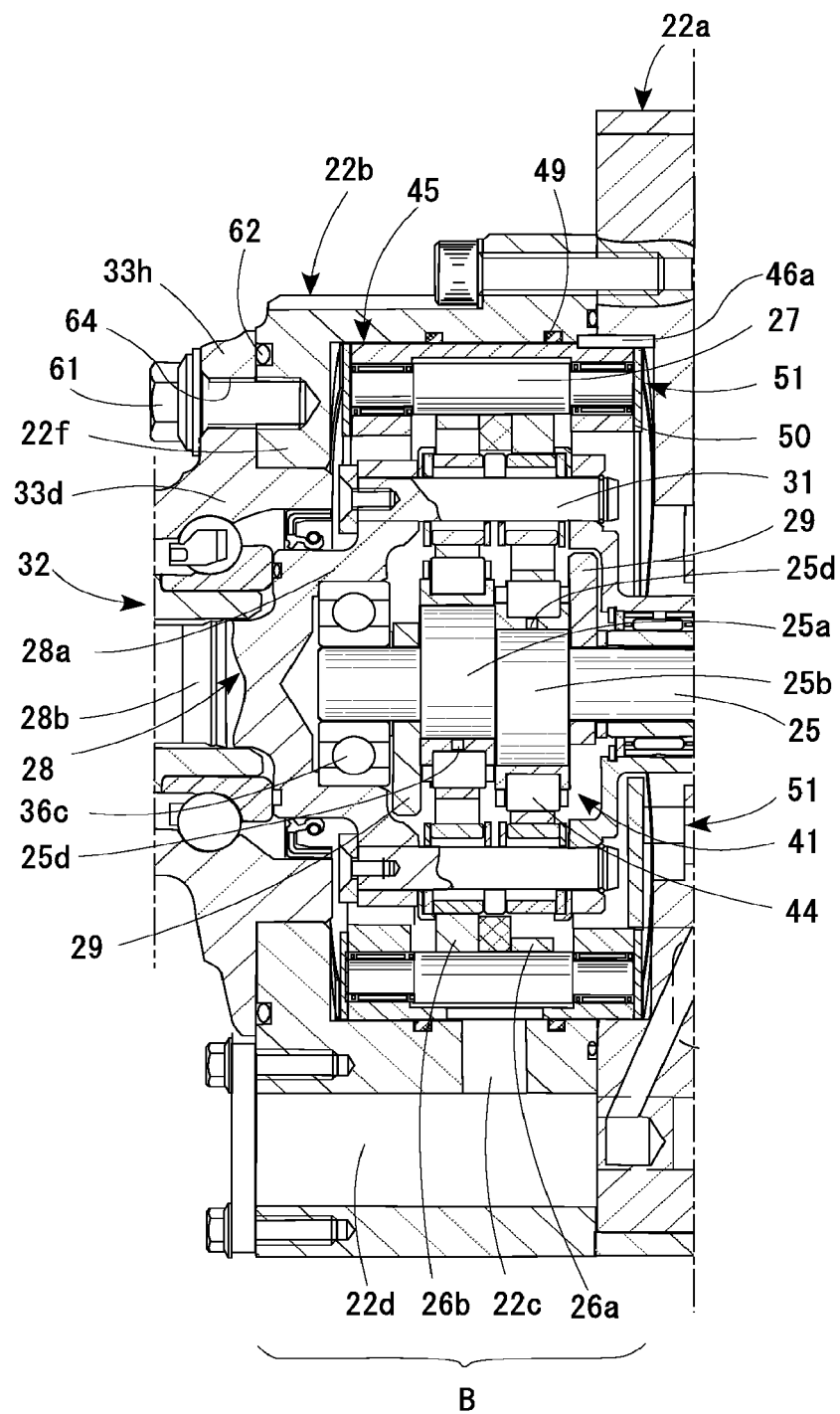
FIG. 3 is an enlarged view of a speed reducer section in FIG. 1.

As shown in FIG. 3, the speed reducer section B includes cycloid discs 26a, 26b which serve as revolving members and are rotatably held by the eccentric sections 25a, 25b; a plurality of outer pins 27 which are held at fixed locations on the speed reducer section housing 22b and serving as outer circumferential engager for engagement with the outer circumferential portion of the cycloid discs 26a, 26b; a motion conversion mechanism which transmits rotational movement of the cycloid discs 26a, 26b to a wheel-side rotation member 28; and counterweights 29 disposed adjacently to the eccentric sections 25a, 25b. The speed reducer section B includes a speed reducer section lubrication mechanism which supplies lubrication oil to the speed reducer section B.

The wheel-side rotation member 28 includes a flange section 28a and a shaft section 28b. The flange section 28a has its end surface formed with holes equidistantly on a circle centering on a rotational center of the wheel-side rotation member 28, for fixing the inner pins 31. The shaft section 28b is fitted into and fixed to a wheel hub 32, and transmits the output from the speed reducer section B to the wheel 14. The flange section 28a of the wheel-side rotation member 28 and the motor-side rotation member 25 are rotatably supported by a roller bearing 36c.

Figure 5:
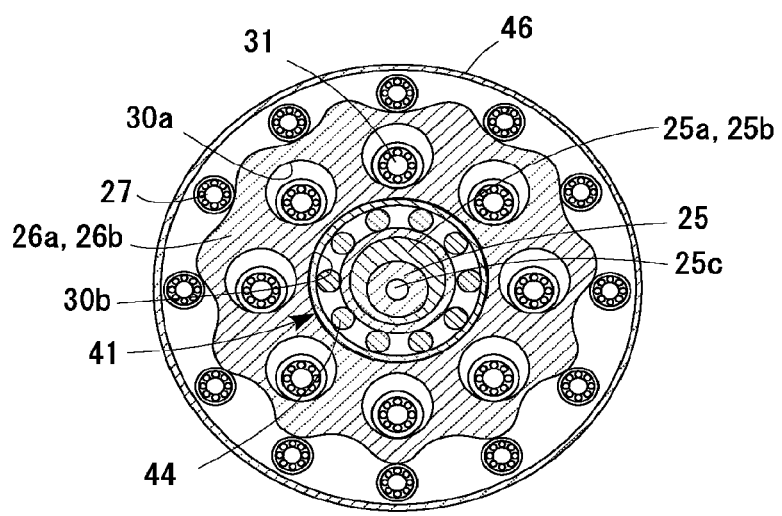
FIG. 5 is a sectional view taken in line V-V in FIG. 1.

As shown in FIG. 5, the cycloid discs 26a, 26b have a plurality of waveforms composed of trochoid curves such as epitrochoid curves, on their outer circumferences, and a plurality of through-holes 30a penetrating from one end surface to the other end surface. The through-holes 30a are made equidistantly on a circle centering on the rotational center of the cycloid discs 26a, 26b, and accommodate inner pins 31 which will be described later. Also, a through-hole 30b penetrates the center of the cycloid discs 26a, 26b, and fits around the eccentric sections 25a, 25b.

The cycloid discs 26a, 26b are supported by roller bearings 41 rotatably with respect to the eccentric sections 25a, 25b. Each of the roller bearings 41 is provided by a cylindrical roller bearing which includes: an inner ring member fitted around an outer diameter surface of the eccentric section 25a, 25b and having an inner track surface on the outer diameter surface; an outer track surface formed directly on an inner diameter surface of the through-hole 30b of the cycloid disc 26a, 26b; a plurality of cylindrical rollers 44 disposed between the inner track surface and the outer track surface; and a retainer (not illustrated) which keeps the distance between the cylindrical rollers 44.

The outer pins 27 are disposed equidistantly on a circular track which centers on the rotational center of the motor-side rotation member 25. As the cycloid discs 26a, 26b make their revolutions, the wavy curves and the outer pins 27 engage with each other and generate rotational movement of the cycloid discs 26a, 26b. The outer pins 27 are supported by needle bearings rotatably with respect to the speed reducer section housing 22b. This reduces contact resistance with the cycloid discs 26a, 26b.

The counterweights 29 are disc-like, have a through-hole at a place away from its center for fitting around the motor-side rotation member 25, and are disposed adjacently to the eccentric sections 25a, 25b respectively, at a 180-degree phase difference from the corresponding eccentric section 25a or 25b in order to cancel unbalanced inertia couple caused by the rotation of the cycloid discs 26a, 26b.

The motion conversion mechanism is constituted by a plurality of inner pins 31 held by the wheel-side rotation member 28 and the through-holes 30a formed in the cycloid discs 26a, 26b. The inner pins 31 is disposed equidistantly on a circular track centering on the rotational center of the wheel-side rotation member 28, and has one of its axial ends fixed to the wheel-side rotation member 28. Also, in order to reduce frictional resistance with the cycloid discs 26a, 26b, needle bearings are provided to make contact with inner wall surfaces of the through-holes 30a of the cycloid discs 26a, 26b.

The through-holes 30a are formed correspondingly to the respective inner pins 31. Each of the through-holes 30a has an inner diameter which is larger, by a predetermined difference, than an outer diameter (a maximum outer diameter including the needle bearing, hereinafter the same will apply) of the inner pins 31.

The speed reducer section lubrication mechanism supplies lubrication oil to the speed reducer section B, and includes a lubrication oil path 25c, lubrication oil inlets 25d, a lubrication oil exit 22c, a lubrication oil reservoir 22d, a rotary pump 51 and a circulation oil path 22g.

The lubrication oil path 25c extends axially inside the motor-side rotation member 25. The lubrication oil supply inlets 25d extend from the lubrication oil path 25c toward an outer diameter surface of the motor-side rotation member 25. In the present embodiment, each of the eccentric sections 25a, 25b is provided with the lubrication oil supply inlet 25d.

The lubrication oil exit 22c, from which the lubrication oil inside the speed reducer section B is discharged, is provided at least at one location in the speed reducer section housing 22b of the speed reducer section B. Also, the lubrication oil exit 22c and the lubrication oil path 25c are connected with each other by the circulation oil path 22g inside the motor section housing 22a. The lubrication oil discharged from the lubrication oil exit 22c flows through the circulation oil path 22g and returns to the lubrication oil path 25c.

The speed reducer section lubrication mechanism further includes cooling means which cools the lubrication oil while the oil passes through the circulation oil path 22g. The cooling means in the present embodiment includes a cooling water path 22e provided in the motor section housing 22a. The cooling means cools not only the lubrication oil but also the motor section A.

Figure 4:
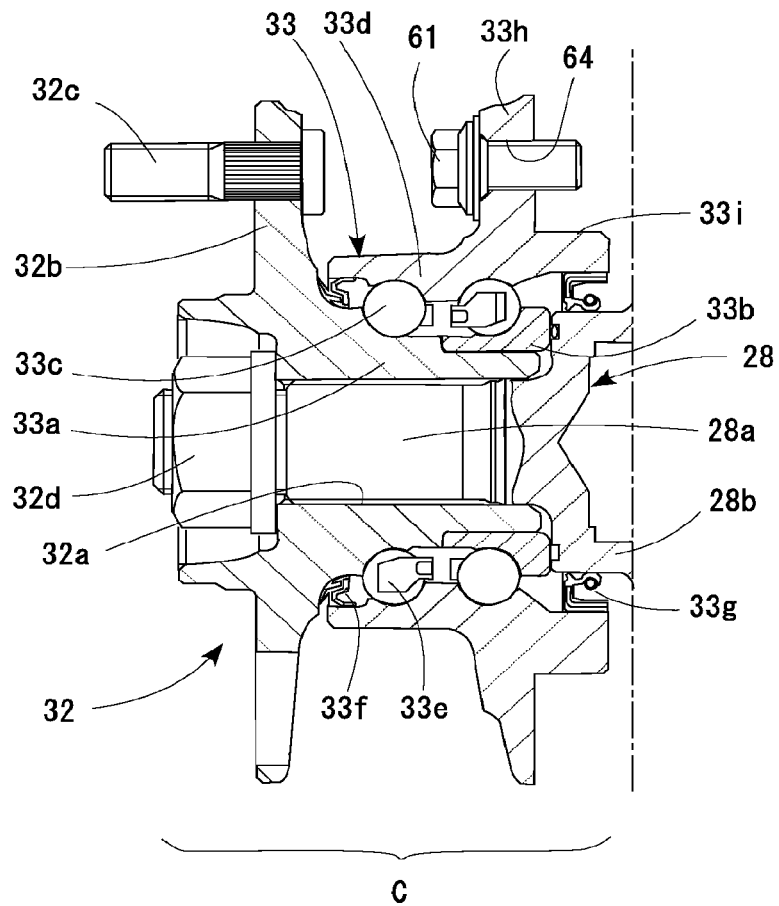
FIG. 4 is an enlarged view of a wheel hub bearing section in FIG. 1.

As shown in FIG. 4, the wheel hub bearing section C includes a wheel hub 32 connected and fixed to the wheel-side rotation member 28, and a wheel hub bearing 33 which supports the wheel hub 32 rotatably with respect to the speed reducer section housing 22b. The wheel hub 32 has a cylindrical hollow section 32a and a flange section 32b. The flange section 32b is fixed and connected with the driving wheel 14 by bolts 32c. The shaft section 28b of the wheel-side rotation member 28 has its outer diameter surface formed with a spline and a male thread. The hollow section 32a of the wheel hub 32 has its inner diameter surface formed with a spline hole. The wheel-side rotation member 28 is threaded into the inner diameter surface of the wheel hub 32 and a nut 32d is threaded around the tip whereby the two members are fastened with each other.

The wheel hub bearing 33 is provided by a double-row angular contact ball bearing which includes: an inside member 33a constituted by an outer-side track surface which is integrally formed on an outer diameter surface of the hollow section 32a in the wheel hub 32 along a laterally outer side with respect to the vehicle, and an inner ring 33b which is fitted around an outer diameter surface of the hollow section 32a of the wheel hub 32 along a laterally inner side with respect to the vehicle and has an outer surface formed with an inner-side track surface; two rows of balls 33c disposed on the outer-side track surface and the inner-side track surface of the inside member 33a; an outer member 33d which has an inner circumferential surface formed with an outer-side track surface and an inner-side track surface opposed to the outer-side track surface and the inner-side track surface in the inside member 33a; a retainer 33e which keeps a distance between mutually adjacent balls 33c; and sealing members 33f, 33g which seal two axial ends of the wheel hub bearing 33.

The outer member 33d of the wheel hub bearing 33 is fixed to the speed reducer section housing 22b with fastening bolts 61.

The outer member 33d of the wheel hub bearing 33 has a flange section 33h on its outer diameter portion, and a cylindrical section 33i on its side facing the speed reducer section B.

The speed reducer section housing 22b has an end surface facing the wheel hub bearing section C, where there is provided an annular portion 22f which makes surface-to-surface contact with the flange section 33h in the outer member 33d of the wheel hub bearing 33 and fitted around the cylindrical section 33i of the outer member 33d.

The annular portion 22f of the speed reducer section housing 22b is formed with an annular groove in its end surface along its outer diametric perimeter for fitting an O ring 62 to provide sealing between itself and the flange section 33h of the outer member 33d of the wheel hub bearing 33.

The flange section 33h of the outer member 33d in the wheel hub bearing 33 has a plurality of bolt insertion holes 64 along its circumference for insertion of the fastening bolts 61.

Also, the annular portion 22f of the speed reducer section housing 22b is formed with bolt holes for the fastening bolts 61 which are inserted through the bolt insertion holes in the flange section 33h of the outer member 33d.

The fastening bolts 61 are inserted from the side on the wheel hub bearing 33, through the bolt insertion holes 64 in the flange section 33h of the outer member 33d. The fastening bolts 61 have their tips threaded into bolt holes in the annular portion 22f of the speed reducer section housing 22b, whereby tight contact is achieved between the flange section 33h of the outer member 33d and the annular portion 22f which represent an end surface of the speed reducer section housing 22b.

Figure 8:
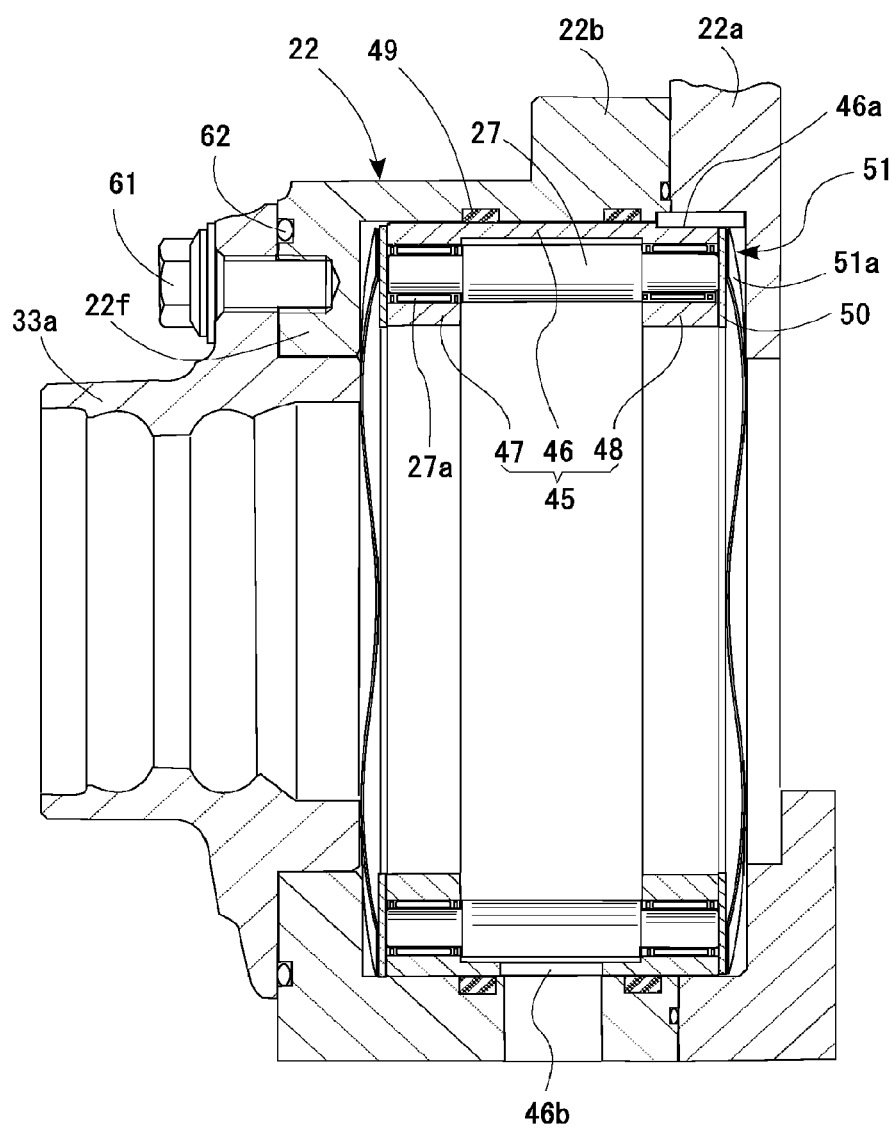
FIG. 8 is an enlarged view showing a state as an example, where a speed reducer section housing and an outer circumferential engager holding section according to the present invention are fixed to each other.

The outer pins 27 are not held directly by the housing 22, but are held as shown in FIG. 8, by the outer pin holders 45 which are fitted and fixed to an inner diameter surface of the housing 22. More specifically, each pin is supported rotatably by a needle bearing 27a which has two axial end portions fixed to the outer pin holder 45. By making the outer pins 27 rotatable with respect to the outer pin holder 45 as described, contact resistance caused by engagement with the cycloid discs 26a, 26b is reduced.

The outer pin holder 45 has a cylindrical portion 46 and a pair of ring portions 47, 48 extending radially inward from respective two axial ends of the cylindrical portion 46. With the above, the outer pin holder 45 is fitted and fixed into an inner diameter surface of the housing 22 via buffer members 49. The buffer members 49 allow the outer pin holder 45 to make axial displacement.

An end plate 50 for the outer pins 27 and an elastic member 51 are disposed between the housing 22 of the speed reducer section B and each of axial end surfaces of the ring portions 47, 48 of the outer pin holder 45. The elastic member 51 includes an elastic member which exerts a restoring force to always keep the outer pin holder 45 at a predetermined position, thereby keeping a correct positional relationship with respect to the housing 22 of the speed reducer section B.

The arrangement also prevents such components as the revolving members, outer circumferential engagers and the motion conversion mechanism, from being damaged by a large load or moment load which could be caused by turning, sudden acceleration/deceleration, etc.

The arrangement also eliminates rattling noise caused by the housing 22 and the outer pin holder 45 due to axial vibration when driving on, e.g., a rough terrain.

Figure 9:
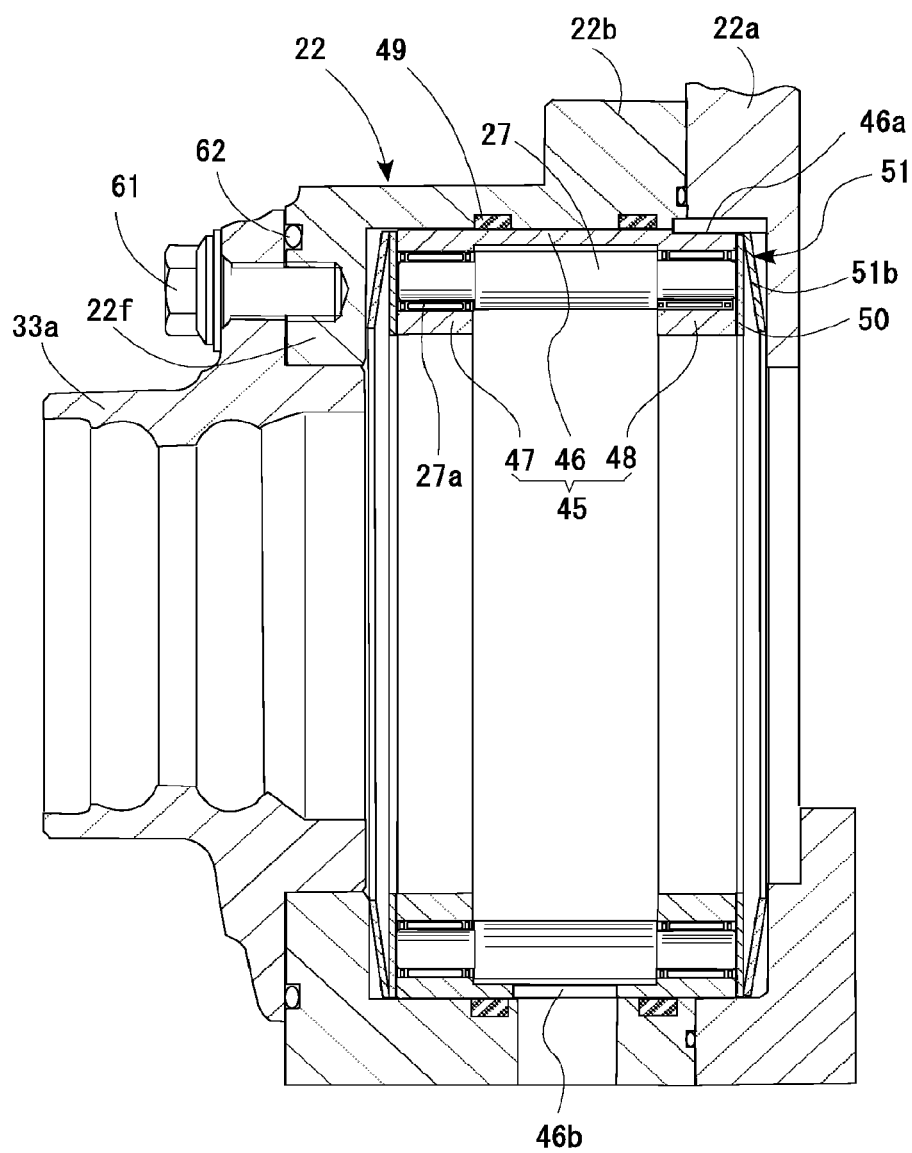
FIG. 9 is an enlarged view showing a state as another example, where a speed reducer section housing and an outer circumferential engager holding section according to the present invention are fixed to each other.
Figure 10:
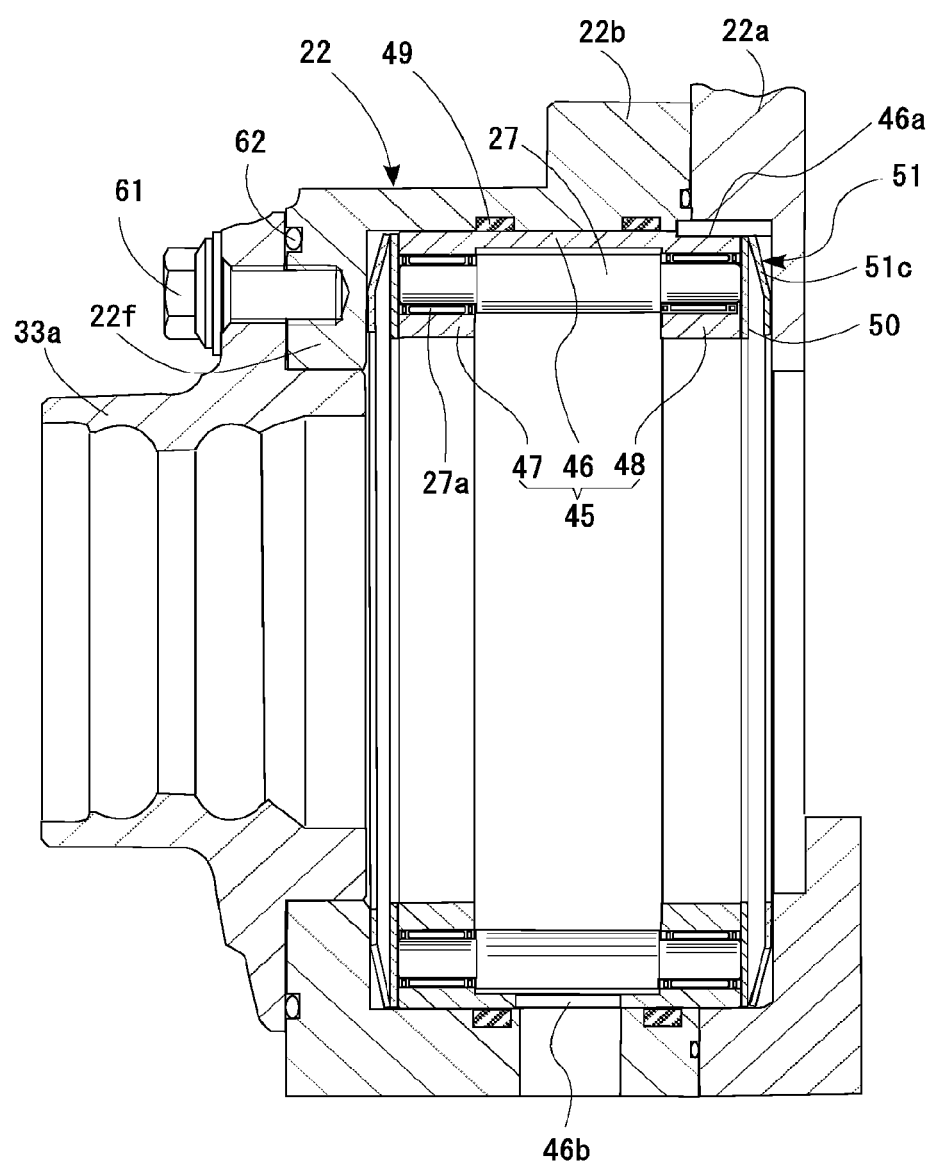
FIG. 10 is an enlarged view showing a state as still another example, where a speed reducer section housing and an outer circumferential engager holding section according to the present invention are fixed to each other.
Figure 11A:
FIG. 11A is a vertical sectional view of an elastic member utilized in the example in FIG. 10.
Figure 11B:
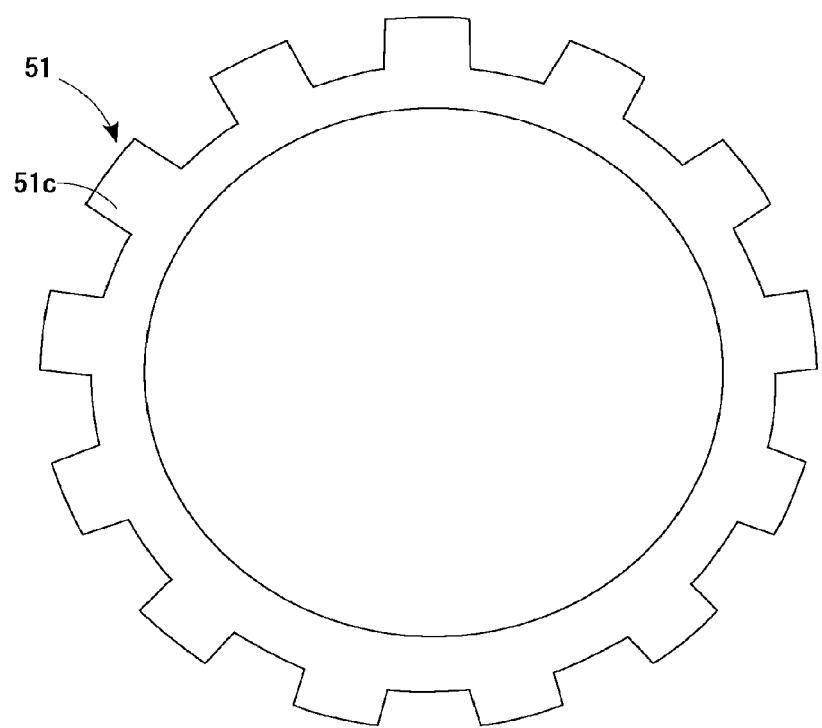
FIG. 11B is a side view of the elastic member utilized in the example in FIG. 10.
Figure 12:
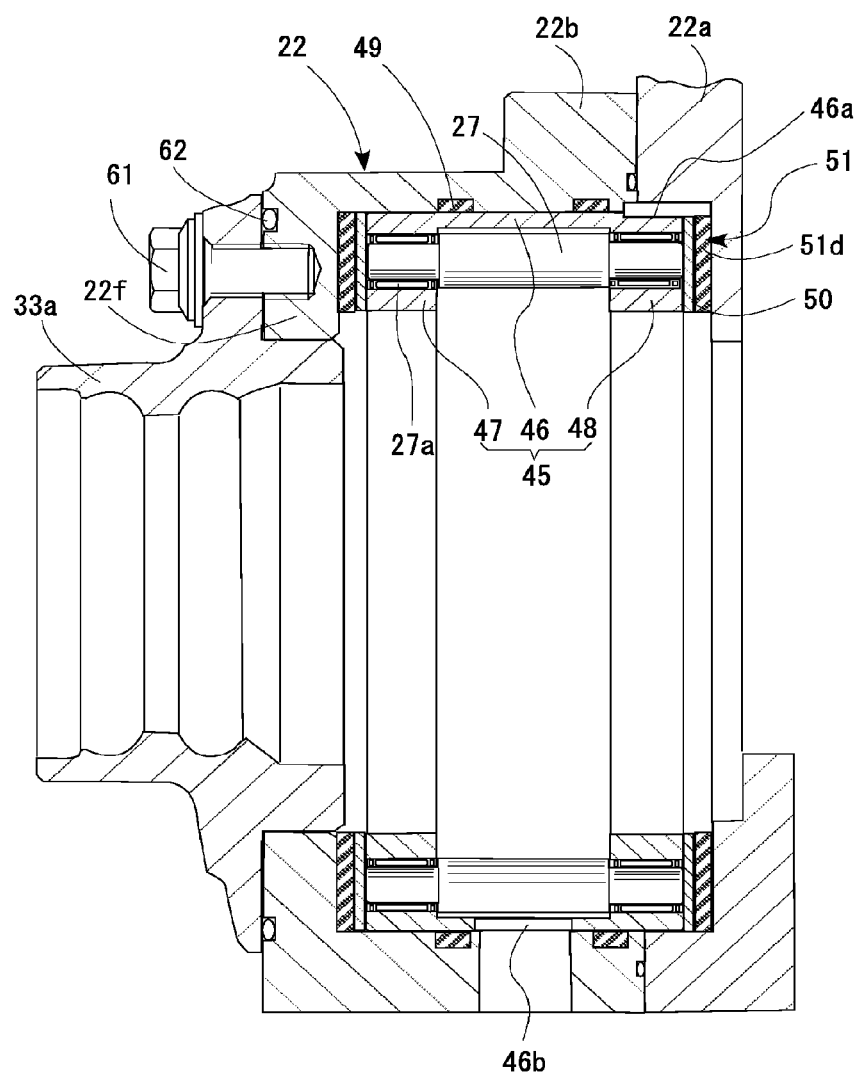
FIG. 12 is an enlarged view showing a state as another example, where a speed reducer section housing and an outer circumferential engager holding section according to the present invention are fixed to each other.

The elastic member 51 may be provided by, e.g., a wave spring 51a as shown in FIG. 8, a disc spring 51b as shown in FIG. 9, a disc spring 51c which has cutouts along its circumference as shown in FIG. 10, FIG. 11A and FIG. 11B, or by an antivibration rubber 51d as shown in FIG. 12.

Figure 13:
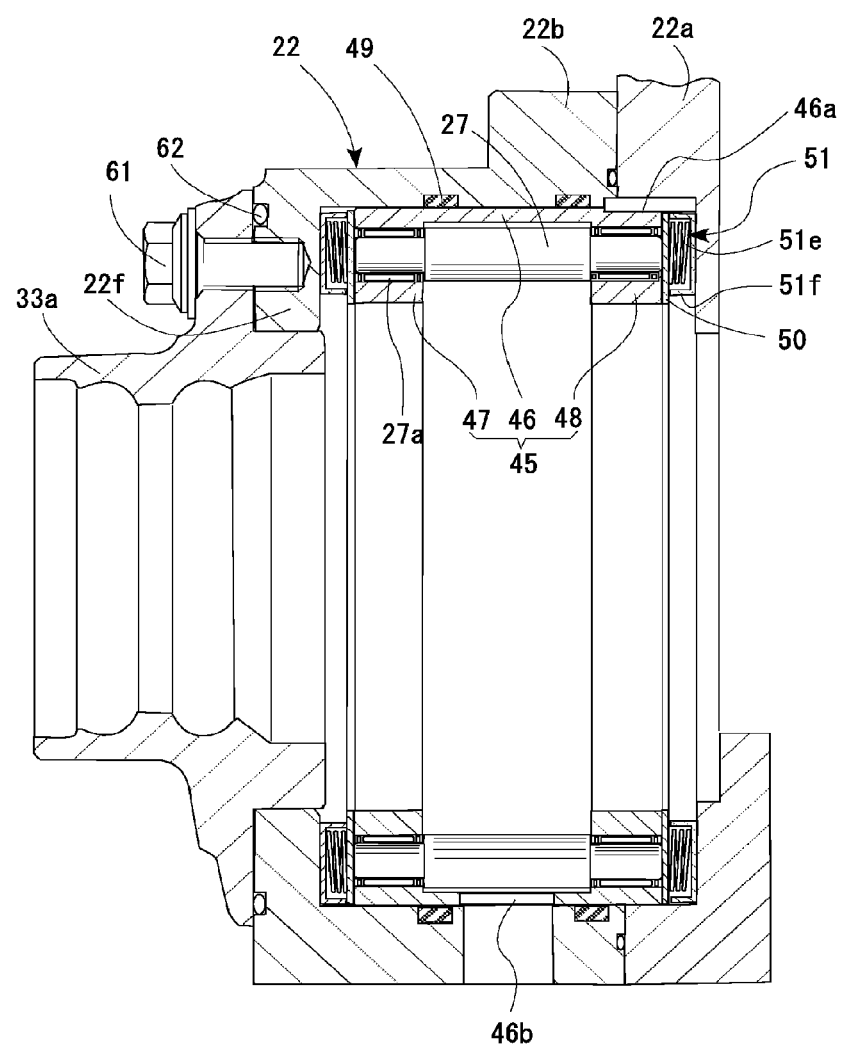
FIG. 13 is an enlarged view showing a state as another example, where a speed reducer section housing and an outer circumferential engager holding section according to the present invention are fixed to each other.

Also, the elastic member 51 may be provided by a plurality of coil springs 51e as shown in FIG. 13 disposed equidistantly along a circumference of the end surface of the housing 22. If the coil springs 51e are used, they should be housed in spring cases 51f.

Also, the elastic member 51 may be connected with the end plate 50. Connecting the member with the end plate 50 improves assemblability into the housing 22.

The end plate 50 and the elastic member 51 may be connected by various methods. An example may be providing a mating recess in one of the two members while providing a mating projection on the other member to mate with the recess. Other example may be to provide a recess in the end plate and pressing the elastic member into the recess, and swaging the two members together.

Figure 14A:
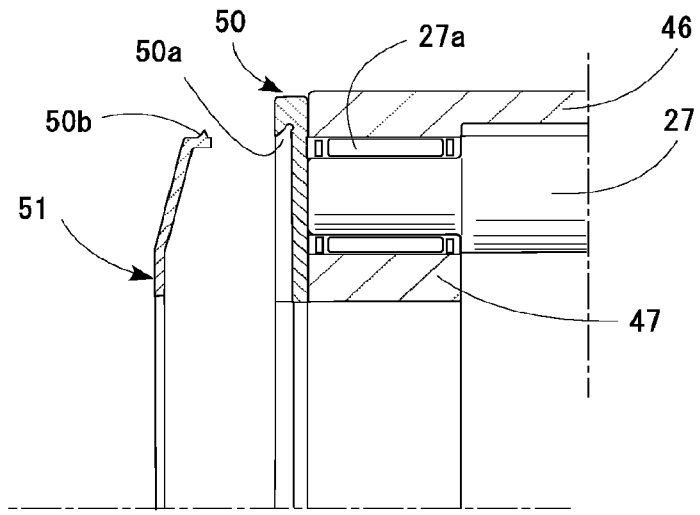
FIG. 14A shows an example of an elastic member utilized in the present invention. The figure is an enlarged partial view showing a state before the elastic member is engaged with an end plate.
Figure 14B:
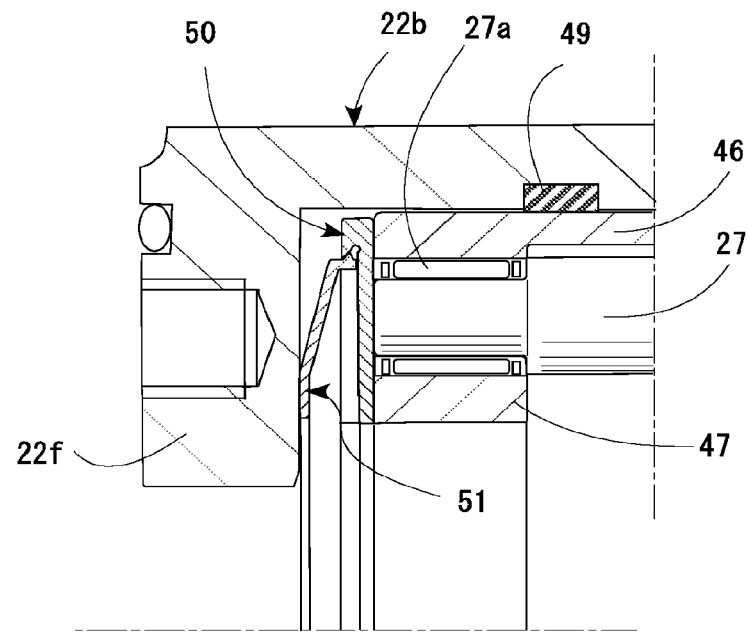
FIG. 14B shows an example of the elastic member utilized in the present invention. The figure is an enlarged partial view showing a state where the elastic member is engaged with an end plate.

FIGS. 14A and 14B show an example of the connection means to connect the end plate 50 and the elastic member 51 with each other, in which the end plate 50 is formed with a mating recess 50a whereas the elastic member 51 which is shaped like a disc spring has a tip portion formed with a mating projection 50b.

Figure 15:
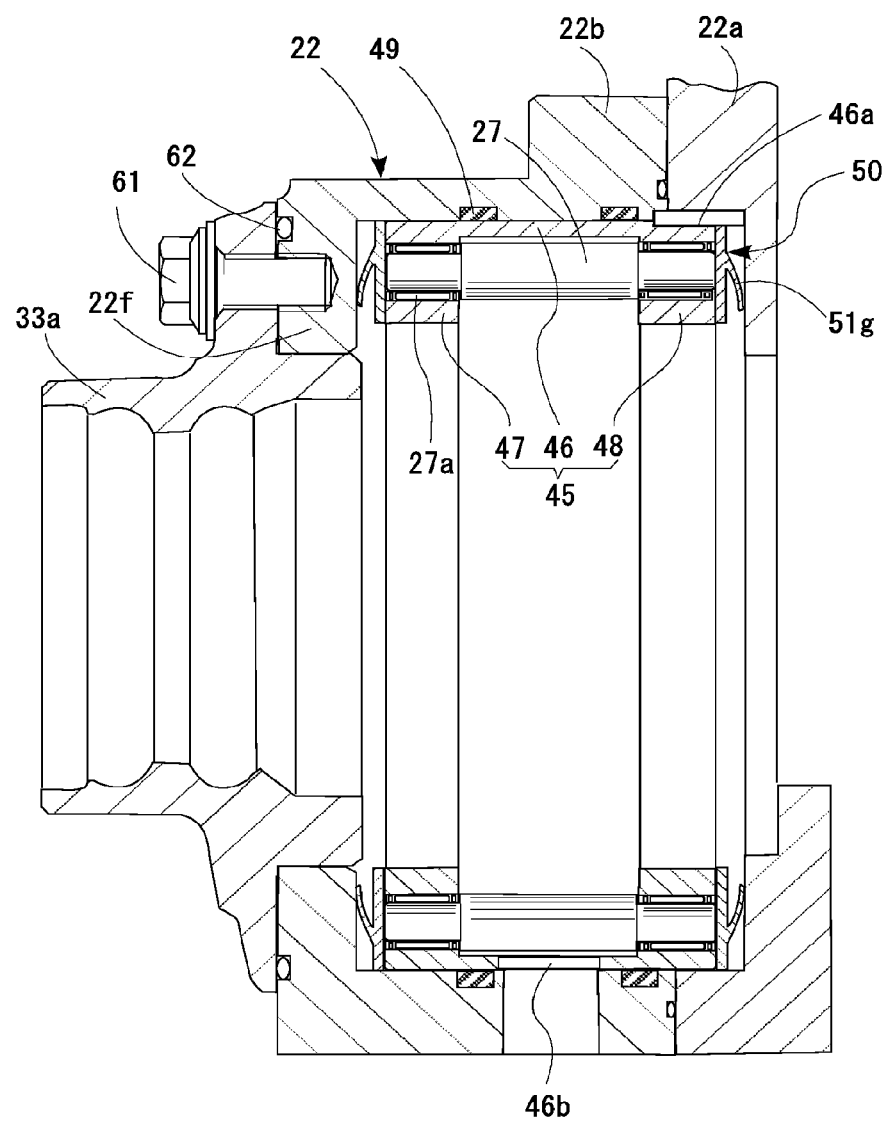
FIG. 15 is an enlarged view showing a state as another example, where a speed reducer section housing and an outer circumferential engager holding section according to the present invention are fixed to each other.
Figure 16:
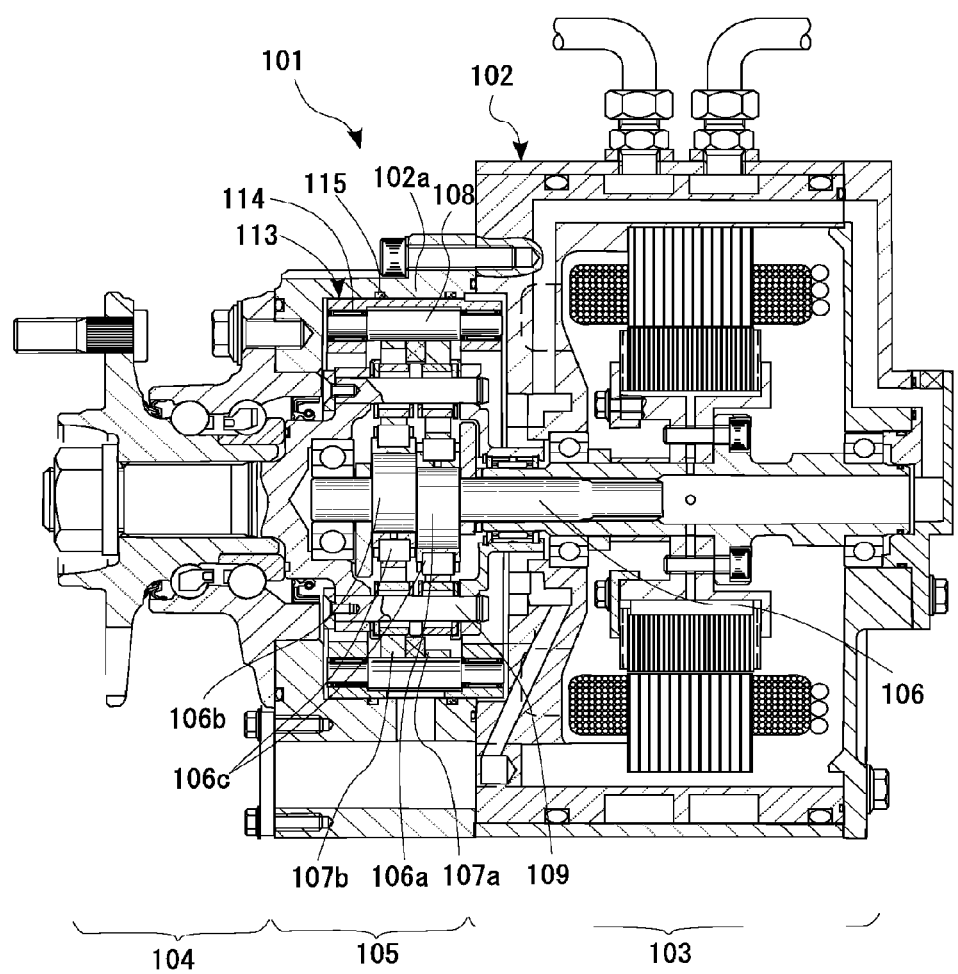
FIG. 16 is a schematic sectional view of a conventional in-wheel motor driving device.
Figure 17:
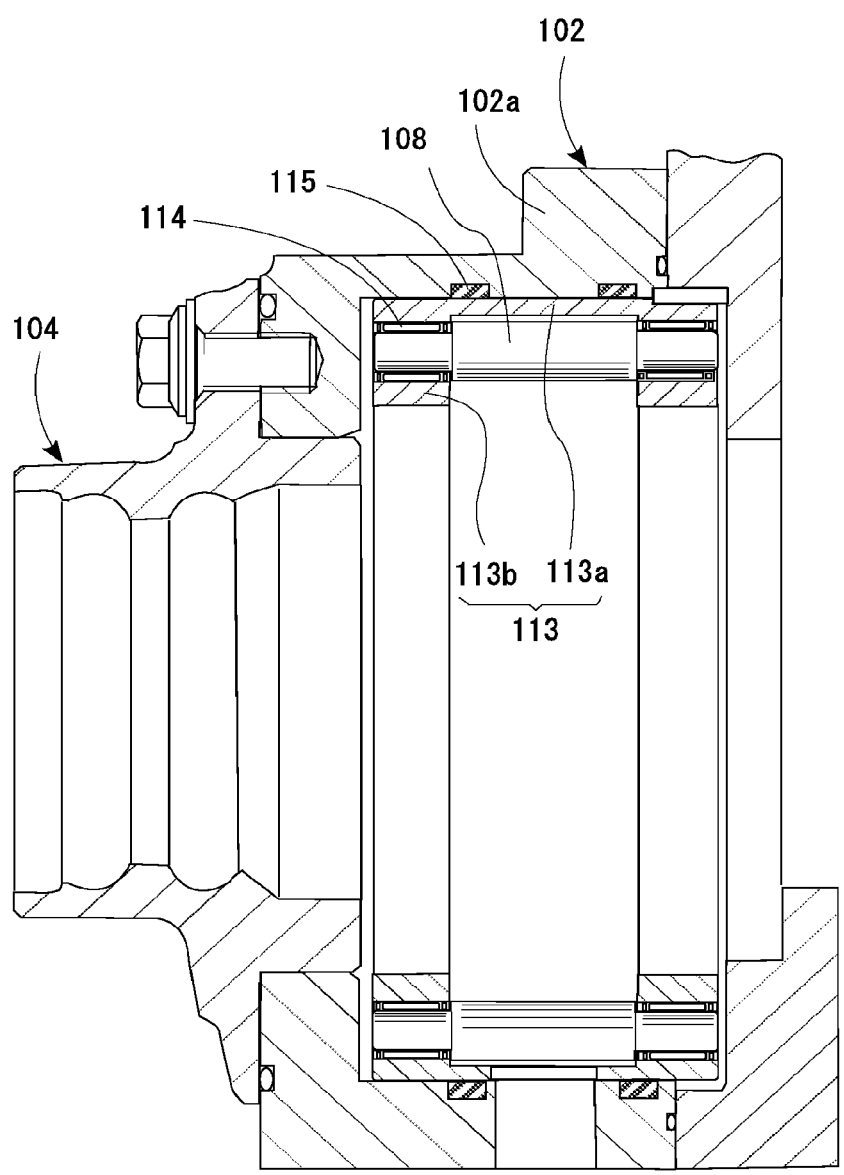
FIG. 17 is an enlarged view showing a state where a speed reducer section housing and an outer circumferential engager holding section in FIG. 16 are fixed to each other.

FIG. 15 shows another example, where the end plate 50 is integrally formed with a spring piece 51g which serves as an elastic member 51. Forming the end plate 50 and the elastic member 51 integrally with each other reduces cost of assembling as well as cost of parts.

The end plate 50 can be formed of a metal or a resin, and the spring piece 51g may be made by cut-and-raise method or integral molding.

It should be noted here that a key groove 46a is provided in an outer diameter surface of the cylindrical portion 46 of the outer pin holder 45. Also, as shown in FIG. 1, another key groove is provided at a position facing the key groove 46a of the housing 22. These key grooves serve as an anti-slipping portion which prevents the outer pin holder 45 from making rotation relative to the housing 22. Specifically, a key (not illustrated) will be disposed across the key grooves, so that the outer pin holder 45 is prevented from making a relative rotation with respect to the housing 22.

The anti-slipping portion may be provided by different means from the one described above. Whatsoever type of anti-slippage portion may be utilized as far as it can prevent relative rotation between the outer pin holder 45 and the housing 22. As an example, an outer diameter surface of the outer pin holder 45 or an inner diameter surface of the housing 22 may be provided with projections protruding toward the other while the other is provided with recesses to be mated by these projections.

Also, at least at one place on the circumference on the cylindrical portion 46, there is formed a cycloid disc insertion hole 46b which is a radially penetrating through-hole for insertion of the cycloid discs 26a, 26b. This allows assembling the cycloid discs 26a, 26b from a radial direction of the outer pin holder 45.

The housing 22 is formed of a light metal such as an aluminum alloy or a magnesium alloy in view of reducing the weight of the in-wheel motor driving device 21. On the other hand, the outer pin holder 45 is preferably made of a carbon steel to meet a requirement for high strength.

Hereinafter, a working principle of the in-wheel motor driving device 21 will be described.

In the motor section A, coils in the stator 23 is supplied with an AC current for example to generate an electromagnetic force. This in turn rotates the rotor 24 which is provided by a permanent magnet or a magnetic member. As the rotor 24 rotates, the motor-side rotation member 25 connected thereto rotates, which then causes the cycloid discs 26a, 26b to make their revolving movements around the rotation center of the motor-side rotation member 25. In this process, the outer pins 27 come into engagement with the curvy wave patterns of the cycloid discs 26a, 26b to cause the cycloid discs 26a, 26b to rotate in the opposite direction to the rotating direction of motor-side rotation member 25.

As the cycloid discs 26a, 26b make their rotational movements, the inner pins 31 which are inserted into the through-holes 30a make contact with inner wall surfaces of the through-holes 30a. In this movement, the revolving movements of the cycloid discs 26a, 26b are not transmitted to the inner pins 31 and only the rotational movements of the cycloid discs 26a, 26b are transmitted to the wheel hub bearing section C via the wheel-side rotation member 28.

In this process, the speed reducer section B reduces the speed of rotation of the motor-side rotation member 25 when the movement is transmitted to the wheel-side rotation member 28. Therefore, the arrangement allows the use of a low-torque high-rotation motor section A since the arrangement can transmits necessary torque to the driving wheel 14 even with such a type of motor section. It should be noted here that the speed reducer section B of the configuration described above has a speed reduction ratio which can be calculated as $(Z_A-Z_B)/Z_B$, where $Z_A$ represents the number of the outer pins 27 whereas $Z_B$ represents the number of wave patterns in the cycloid discs 26a, 26b. FIG. 5 shows an embodiment with $Z_A=12$ and $Z_B=11$, which gives a very large speed reduction ratio of 1/11.

As understood, an in-wheel motor driving device 21 which is compact and has a high speed-reduction ratio can be achieved by utilizing a speed reducer section B which can provide a large speed reduction ratio without requiring a multi-stage configuration. Also, use of needle bearings in outer pins 27 and inner pins 31 reduces frictional resistance of these members with the cycloid discs 26a, 26b, which improves transmission efficiency in the speed reducer section B.

By utilizing in-wheel motor driving devices 21 according to the above embodiment in an electric vehicle 11, it becomes possible to reduce an unsprung weight. As a result, it becomes possible to obtain an electric vehicle 11 which provides superior driving stability.

In the embodiment described above, the lubrication oil supply inlet 25d is formed at the eccentric sections 25a, 25b. The invention is not limited to this, however, and oil supply inlet may be formed at any place in the motor-side rotation member 25. Note, however, that in view of stable supply of the lubrication oil to the roller bearing 41, it is preferable that the lubrication oil supply inlets 25d are located at the eccentric sections 25a, 25b.

Also, in the embodiment described above, the speed reducer section B has two cycloid discs 26a, 26b which have a 180-degree phase difference from each other. However, the number of the cycloid discs may be any. For example, three cycloid discs may be used at a 120-degree phase difference.

Further in the embodiment described above, the motion conversion mechanism is constituted by the inner pins 31 fixed to the wheel-side rotation member 28 and the through-holes 30a provided at the cycloid discs 26a, 26b. However, the present invention is not limited by this, and a motion conversion mechanism of whatsoever configuration may be employed as far as it can transmit the rotation of the speed reducer section B to the wheel hub 32. For example, the motion conversion mechanism may be constituted by inner pins fixed to the cycloid discs and holes in the wheel-side rotation member.

It should be noted here that in the embodiment described above, working of components are described with their rotation in focus. Actually, however, a force which includes a torque is transmitted from the motor section A to the driving wheel. Therefore, the driving force provided as a result of speed reduction described above has a high torque.

Also, in the above description of the embodiment, electric power was supplied to the motor section A to drive the motor section A, and the driving force from the motor section A was transmitted to the driving wheel 14. There may be an additional, inverse arrangement for situations where the vehicle is decelerating or running down on a slope, to pick a force from the driving wheel 14 and convert it by the speed reducer section B into a high-speed low-torque rotation and transmit this rotation to the motor section A, so that the motor section A can serve as a power generator. Further, there may be an arrangement to store the power generated in this way in a battery for later use to drive the motor section A for example, or operate other electric components on board.

Further, a brake system may be added to the above-described embodiment. For example, in the configuration shown in FIG. 1, the housing 22 may be extended in the axial direction to provide a space on the right-hand side of the rotor 24 as in FIG. 1, for a rotating member which rotates integrally with the rotor 24; a piston which is not rotatable with respect to the housing 22 but movable in the axial direction; and a cylinder which can actuate the piston, so that the piston can be fitted with the rotating member to lock the rotor 24 thereby providing a parking brake system while the vehicle is parked.

Alternatively, the brake system may be a disc brake system. Namely, a flange formed on a part of a rotating member which rotates integrally with the rotor 24, and friction discs disposed at the housing 22 side, are pinched by a cylinder disposed at the housing 22 side. Still further, the brake system may be a drum brake system, where the rotating member is formed with a drum; brake shoes are fixed to the housing 22, and the rotating member is locked by frictional self-engaging operation.

In the embodiment described above, the cycloid discs 26a, 26b were supported by cylindrical roller bearings. However, the present invention is not limited by this. For example, the bearing may be replaced by slide bearings, cylindrical roller bearings, tapered roller bearings, needle bearings, self-aligning roller bearings, deep groove ball bearings, angular contact ball bearings, four-point contact ball bearings, or any other types of bearings regardless of whether they are slide bearings or rolling bearings, whether the rolling elements are rollers or balls, or whether the bearings are single row type or double row type. The above applies to any other bearings which are disposed elsewhere in the device, so whatsoever types of bearing may be used.

It should be noted, however, that deep groove ball bearings have a higher allowable limit in terms of the number of rotations but have a lower load capacity as compared to cylindrical roller bearings. For this reason, a large deep groove ball bearings will have to be utilized in order to achieve a necessary load capacity. Therefore, cylindrical roller bearings will be more suitable as the roller bearing 41 in view of making the in-wheel motor driving devices 21 more compact.

In the above-described embodiments, the motor section A was provided by a radial gap motor. However, the present invention is not limited to this, and any suitable motor may be employed. For example, an axial gap motor which includes a stator fixed to a housing, and a rotor which is disposed inside the stator with an axial gap may be utilized.

Further, the electric vehicle 11 shown in FIG. 6 had the rear wheels 14 serving as driving wheels. However, the present invention is not limited to this, and the front wheels 13 may serve as the driving wheels or the vehicle may be a four-wheel drive vehicle. It should be noted here that in the present description, the term "electric vehicle" means any type of vehicle which is driven by electricity. For example, therefore, hybrid cars and similar vehicles should also be included in this category.

Thus far, embodiments of the present invention have been described with reference to the drawings. However, the present invention is not limited to these illustrated embodiments. Any of these embodiments illustrated thus far may be modified or changed in many ways within the scope or within the equivalence of the present invention.

REFERENCE SIGNS LIST 11 electric vehicle
12 chassis
12a wheel housing
12b suspension system
13 front wheels
14 rear wheels
22 housing
22b speed reducer section housing
27 outer pins (outer circumferential engager)
45 outer pin holder (outer circumferential engager holding section)
50 end plate
51 elastic member
51a wave spring
51b disc spring
51c disc spring
51d antivibration rubber
51e coil spring
51f spring case
51g spring piece

The invention claimed is:

1. An in-wheel motor driving device comprising:
a motor section which drives and thereby rotates a motor-side rotation member having eccentric sections;
a speed reducer section which reduces a rotating speed of the motor-side rotation member for transmission to a wheel-side rotation member;
a housing which holds the motor section and the speed reducer section; and
a wheel hub which is fixed to and connected with the wheel-side rotation member;
wherein the speed reducer section includes:
a revolving member which has a through-hole for insertion of the eccentric section and makes a revolving movement around a rotation axis of the motor-side rotation member in association with the rotation of the motor-side rotation member;
an outer circumferential engager which makes engagement with an outer circumferential portion of the revolving member thereby causing a rotational movement of the revolving member;
an outer circumferential engager holding section fitted and fixed to an inner diameter surface of the housing which holds the speed reducer section, for holding the outer circumferential engager in parallel with the rotational axis of the motor-side rotation member; and
a motion conversion mechanism which converts the rotational movement of the revolving member into rotational movement of the motor-side rotation member about its rotation axis, for transmission to the wheel-side rotation member,
wherein an elastic member is disposed on one or each of two axial end surfaces of the outer circumferential engager holding section, between the housing and the outer circumferential engager holding section.

2. The in-wheel motor driving device according to claim 1, wherein a buffer member is disposed between an outer circumferential surface of the outer circumferential engager holding section and the housing.

3. The in-wheel motor driving device according to claim 1, wherein the elastic member is provided by a wave spring.

4. The in-wheel motor driving device according to claim 1, wherein the elastic member is provided by a disc spring.

5. The in-wheel motor driving device according to claim 1, wherein the elastic member is provided by a disc spring which has cutouts in its circumferential direction.

6. The in-wheel motor driving device according to claim 1, wherein the elastic member is provided by an antivibration rubber.

7. The in-wheel motor driving device according to claim 1, wherein the elastic member is provided by a plurality of coil springs disposed on an end surface of the housing equidistantly in a circumferential direction.

8. The in-wheel motor driving device according to claim 1, wherein an end plate for the outer circumferential engager is disposed between the elastic member and the outer circumferential engager.

9. The in-wheel motor driving device according to claim 8, wherein the elastic member and the end plate are connected with each other.

10. The in-wheel motor driving device according to claim 9, wherein one of the end plate and the elastic member is formed with an engaging recess while the other is formed with an engaging projection.

11. The in-wheel motor driving device according to claim 9, wherein the end plate is formed with a recess, into which the elastic member is pressed.

12. The in-wheel motor driving device according to claim 8, wherein the elastic member is formed integrally with the end plate.

* * * * *